May 12, 1959 L. D. COBB 2,886,152

ONE-WAY CLUTCH

Filed Feb. 18, 1954

INVENTOR
Leland D. Cobb
BY Edward H. Goodrich
ATTORNEY

United States Patent Office 2,886,152
Patented May 12, 1959

2,886,152

ONE-WAY CLUTCH

Leland D. Cobb, Forestville, Conn., assignor to General Motors Corporation, Detroit, Mich., a corporation of Delaware Application February 18, 1954, Serial No. 412,753

6 Claims. (Cl. 192—45.1)

The present invention relates to one way clutches which employ a plurality of so-called "sprags" or tiltable grippers and more particularly to cage means for retaining the sprags in engagement with a pair of relatively rotatable races.

One form of one way clutches employs a plurality of substantially identical sprags or tiltable grippers that are disposed between relatively rotatable inner and outer races having substantially concentric cylindrical surfaces. The sprags may be positioned so that when the races are rotated relatively in one direction, the sprags will be wedged between the races and transmit torque from one race to another. However, when the races rotate relatively in the opposite direction the sprags will no longer be wedged between the races but will merely slide on the cylindrical surfaces and permit the races to freewheel. In order to insure satisfactory operation of such a clutch, it is desirable to provide cage means for retaining the sprags properly positioned between the races. This will assist the sprags in simultaneously moving into or out of wedging engagement with the races so that each individual sprag will absorb its full share of the torque. In addition it has been found desirable to employ a pair of relatively rotatable cage members that are disposed concentrically one about the other with registering openings therethrough. The ends of the sprags may project from the cages so that relative rotation of the cages will cause controlled tiltable movement of the sprags into and out of driving engagement with the races.

When two relatively rotatable cages are employed, if one sprag moves into driving engagement with the races, it will cause the cages to rotate and force the remaining sprags into simultaneous driving engagement with the races. Heretofore, these cages have been fabricated of relatively heavy material and do not have any resilience which will permit any circumferential movement between the sprags. As a result when the sprags move into driving engagement with the races and tend to move the cages, the inertia of the cages frequently retards the movement of the sprags thus interfering with the operation of the clutch. In addition, due to slight circumferential misplacement of the openings in the two cages and variations in the size and shape of the sprags, there is frequently "fight" or interference between the cages and the sprags as they move into engagement. This interference may prevent all of the sprags properly engaging and/or it may cause destructive stresses to occur in the cages.

It is now proposed to provide resilient cage means for a sprag clutch which may include one or more cages relatively rotatable to each other. Each of the cages may be manufactured by any suitable means but it has been found preferable to employ a sheet metal member which is cut to the proper length and bent into a circular or cylindrical shape so as to have a plurality of circumferentially spaced windows therethrough for receiving the sprags. The opposite ends of each of the cage members may be disposed adjacent each other. The ends of the cages are preferably not secured together so that they may move relative to each other. Since the ends of the cage may spread, the windows and also the sprags may move circumferentially relative to each other, thus allowing the sprags to move circumferentially a limited amount relative to each other without overstressing the cages.

When one or more cages are employed in sprag clutches, it has been found highly desirable that the cages be retained substantially concentric with the races at all times. If the cage or cages are eccentric with respect to the races, when the sprags move into or out of engagement with the races, the openings for the sprags will not be properly positioned. Thus before the sprags can move into locking engagement they must move the cages into concentric relation with the races. This movement of the cages retards the movement of the sprags and interferes with the proper locking engagement of the sprags.

It is now proposed to provide means for retaining the cages properly centered at all times. This is accomplished by providing shoulder means which project from the sides of the sprag for engagement with the cages. The shoulder means on each sprag may be uniformly spaced from the races so that the point of contact between the shoulders and cages will always be equally spaced from the races and thus prevent the cage becoming eccentric with respect to the races.

Figure 1:
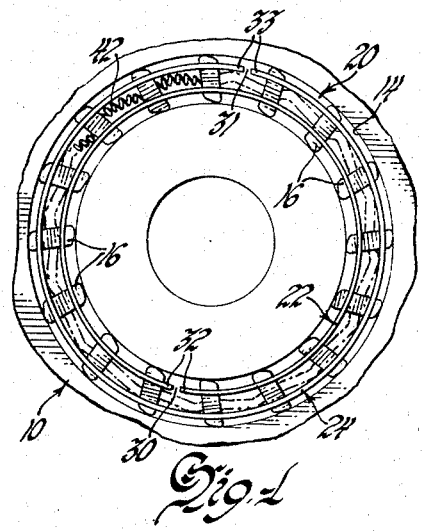
Fig. 1 is a side view of a sprag clutch embodying the present invention.
Figure 2:
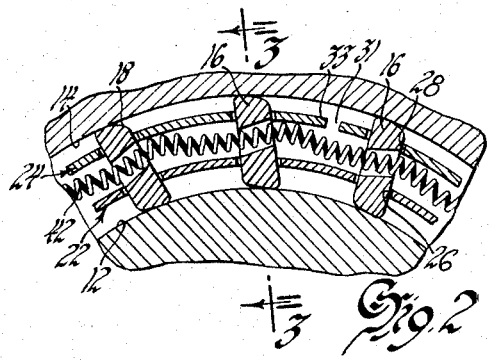
Fig. 2 is a fragmentary cross sectional view of a portion of the sprag clutch shown in Fig. 1 taken along a plane substantially normal to the axis of rotation.

Referring to the drawings in more detail, the present invention may be embodied in any suitable one way clutch 10 adapted to be disposed between a substantially cylindrical inner race 12 and a substantially cylindrical outer race 14 disposed in spaced concentric relation therewith. In the present instance the clutch 10 is of the so-called "sprag" type wherein a plurality of substantially identical tiltable grippers or sprags 16 are adapted to be disposed in circumferentially spaced relation between the inner and outer races 12 and 14. Each of the sprags 16 is disposed in a nearly radial position about the axis of rotation. The inner and outer ends of the sprags may be provided with cam surfaces 18 that are positioned to engage the races 12 and 14. The cam surfaces 18 are disposed so that one diagonal of the sprags 16 is not only longer than the other diagonal but also longer than the radial distance between the two races 12 and 14. The cam surfaces 18 are adapted to be held in engagement with the races 12 and 14 so that when the outer race 14 rotates counterclockwise relative to the inner race 12, the cam surfaces 18 will merely slide on the races 12 and 14 but when the outer race 14 rotates clockwise relative to the inner race 12, the sprags 16 will rotate so that the longer diagonal is more nearly radial and the sprags 16 are wedged between the inner and outer races 12 and 14. Thus when the outer race 14 rotates counterclockwise relative to the inner race 12, it will overrun the inner race 12, but when it rotates clockwise relative thereto the sprags 16 will be in a wedged position so as to transmit torque from one race to the other.

Any suitable cage means 20 may be disposed between the inner and outer races 12 and 14 for retaining the sprags 16 disposed at substantially uniform circumferential intervals. In the present instance the cage means 20 include an inner cage 22 and an outer cage 24 which are disposed concentrically between the races 12 and 14.

The inner cage 22 which is preferably fabricated from a piece of sheet metal may be formed into a cylinder. The diameter of the cylinder is slightly larger than that of the inner race 12 so that the inner cage 22 may be disposed adjacent the inner race 12 in spaced relation thereto. This cage 22 may be provided with a plurality of openings 26 that are circumferentially spaced therein. The openings 26 may be adapted to receive the sprags 16 so that the inner ends thereof may project from the cage and allow the cam surfaces 18 to engage the race 12.

The outer cage 24 may be of substantially the same construction as the inner cage 22 but slightly larger. The diameter of the outer cage 24 may be slightly smaller than the outer race 14 so that it may be disposed in spaced relation between the inner cage 22 and the outer race 14. The outer cage 24 may also be provided with a plurality of openings 28 therethrough that are circumferentially spaced to register with the openings 26 in the inner cage 22. Thus the outer ends of the sprags 16 may project from the outer cage 24 so that the cam surface 18 thereon may engage the outer race 14.

The openings 26 and 28 in each of the cages 22 and 24 are preferably just large enough to allow the sprags 16 to be disposed therein. The openings 26 and 28 preferably allow a minimum amount of clearance or space between the sprags 16 and the edges of the openings 26 and 28. Since each of the sprags 16 are a close fit in the openings, any relative rotation of the two cages 22 and 24 will cause all of the sprags 16 to be tilted correspondingly. Conversely, movement of any one sprag 16 will force the two cages 22 and 24 to rotate in opposite directions and thus cause all of the remaining sprags 16 to simultaneously tilt through corresponding extents. It will thus be apparent that as soon as the races 12 and 14 rotate in the driving direction at least one sprag will wedge between the races 12 and 14 and cause relative rotation or circumferential movement between the cages 22 and 24. This in turn will result in all of the sprags 16 simultaneously moving into wedging engagement with the races 12 and 14. Since all of the sprags 16 are simultaneously forced into wedging engagement with the races 12 and 14, all of the sprags 16 carry substantially equal loads rather than allowing a relatively small number of sprags 16 to absorb the full load.

Due to manufacturing tolerances, there may be slight variations in the lengths of the sprags 16 and the contours of the cam surfaces 18. These variations between the sprags 16 in turn will result in the individual sprags 16 being disposed at varying angles to the radii. Since the sprags 16 will be at various angles and the openings 26 and 28 in the cages 22 and 24 are a close fit on the sprags 16, it will be necessary to have circumferential movement between the registering openings 26 and 28 in the cages 22 and 24. If there is no relative movement the sprags 16 will not be properly positioned to take a uniformly distributed load and there may be destructive stresses set up on the cages 22 and 24. Accordingly, the inner and outer cages 22 and 24 may be made resiliently deflectable in circumferential directions by providing a space 30 and 31 between the opposite ends 32 and 33 thereof. This will permit relative movement between the ends 32 and 33 and allow resilient deformation of the cages 22 and 24.

Thus when the sprags 16 rotate into or out of engagement with the races 12 and 14 and they tend to turn more than is normally permitted by the openings 26 and 28 in the cages 22 and 24, the cages will expand or contract circumferentially. This in turn will allow the sprags 16 to be moved into the correct positions for engagement with the races 12 and 14. It should be noted that if the spaces 30 and 31 between the ends 32 and 33 of the inner and outer cages 22 and 24 are diametrically opposed, a more integral assembly will be provided.

In order to retain the cam surfaces 18 of the sprags 16 against the races 12 and 14 at all times, any suitable spring means 40 may be provided for applying a resilient couple to the sprags 16 for urging each of the individual sprags in a clockwise direction. This will urge all of the cam surfaces 18 towards the races 12 and 14 at all times. In the present instance the spring means 40 comprises a coil spring 42 which has the opposite ends thereof secured together to form an annulus or so-called "garter" spring. The spring 42 may be disposed between the inner and outer cages 22 and 24 so as to extend through openings 44 in the sprags 16. The openings 44 are preferably positioned to deflect the spring 42 enough to apply a resilient torque to the sprags 16 that urges them clockwise against the races 12 and 14.

It has been found advantageous to maintain the cages 22 and 24 substantially concentric with the races 12 and 14 so as to prevent interference between the cages 22 and 24 and the sprags 16 as they move into and out of locking engagement with the races 12 and 14. Accordingly, lugs 50 may be provided on the sprags 16 so as to project laterally outwardly therefrom circumferentially of the cage or cages. The lugs 50 may have shoulders or surfaces 52 thereon which are preferably substantially uniformly spaced from the races 12 or 14 and positioned to engage the cages 22 or 24. Thus the surfaces 52 will engage the cages 22 and 24 and limit the radial movement thereof.

Figure 4:
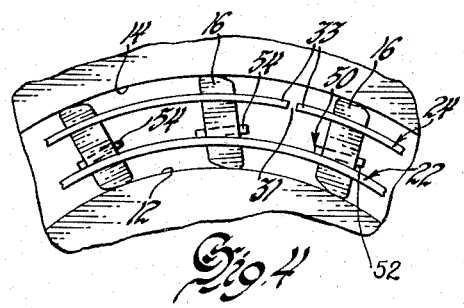
Fig. 4 is a fragmentary view of a portion of a modification of the sprag clutch of Fig. 1.
Figure 3:
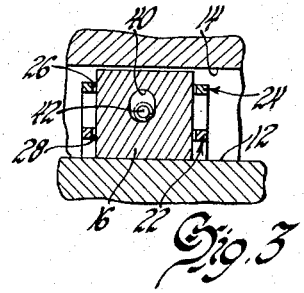
Fig. 3 is a cross sectional view taken substantially along the plane of line 3—3 in Fig. 2.
Figure 5:
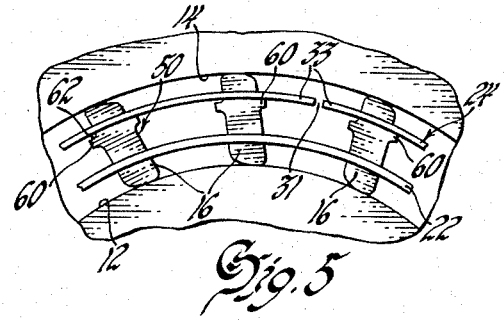
Fig. 5 is a fragmentary view similar to Fig. 4 and showing a further modification.
Figure 6:
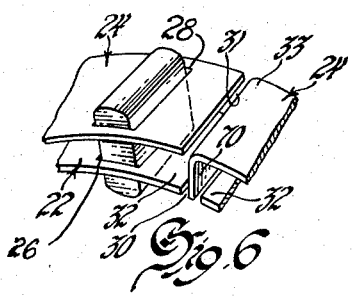
Fig. 6 is a fragmentary perspective view of a further modification.

In the modification of Fig. 4 a pin 54 or other suitable means is positioned to project from the opposite sides of the sprags 16 and engage the exterior of the inner cage 22. It can thus be seen that since these pins 54 are circumferentially spaced around the entire periphery of the inner cage 22 and are substantially equally spaced from the inner race 12, the inner cage 22 will be maintained in substantially concentric relation with the inner race 12 at all times.

If desired, instead of employing separate pins, the sprags 16 may be provided with an integral portion which projects therefrom to form the shoulders 60. The shoulders 60 may be positioned to form a plurality of surfaces 62 that are substantially equally spaced from the races 12 and 14 and are adapted to engage the outer cage 24 and support it concentric with the races 12 and 14. It may be desirable to provide an arcuate surface 62 on this shoulder 60 which will be concentric with the effective rolling center of the sprags 16 on the inner race 12. Thus regardless of the inclination of the sprags 16, the points of contact between shoulders 60 and the cage 24 will always be substantially uniformly spaced from the races 12 and 14. Therefore as the sprags 16 move into and out of locking engagement with the races 12 and 14, the cages 22 and 24 will always remain concentric and the sprags 16 will never have to move the cages 22 or 24 radially.

It may be found desirable to limit the amount of angular movement of the sprags 16 by limiting the amount of relative rotation between the inner and outer cages 22 and 24. Accordingly, the spaces 30 and 31 between the ends 32 and 33 of the two cages 22 and 24 may be disposed in substantial radial alignment and a flange on one cage may project into the space formed by the ends of the other cage. In the present instance one end 33 of the outer cage 24 is bent radially inwardly to form a flange 70 that extends between ends 32 of the inner cage 22. It will thus be seen that whenever excessive amounts of rotational displacement occur between the two cages 22 and 24, the flange 70 on the outer cage 24 will engage the ends 32 of the inner cage 22 so as to limit rotational movement thereof. It is thus quite apparent that the limits to the amount of rotational movement between the two cages 22 and 24 may be varied by the size of the spaces 30 and 31 between the spaced ends 32 and 33 of the cages 22 and 24.

In assembling the clutch parts, the sprags 16 may be initially entered through the inner cage 22 and the spring 42, if used, may be threaded through the sprags after which the outer cage 24, due to its open ends, may be easily sprung over into interfitting relation with the sprags.

It is to be understood that, although the invention has been described with specific reference to particular embodiments thereof, it is not to be so limited since changes and alterations therein may be made which are within the full intended scope of this invention as defined by the appended claims.

What is claimed is:

1. A sprag adapted for use in a one way clutch having cage means disposed between a pair of coaxial cylindrical races, said sprag comprising a rigid body portion, said sprag having cam surfaces disposed on the opposite ends of said body portion for engagement with said races, and having substantially flat side walls formed integral with said body portion, a pair of lugs projecting respectively from the opposite side wall for engaging said cage means, said lugs having arcuate cage-supporting shoulders located substantially concentric with the line of engagement between one of said cam surfaces and one of said races.

2. A one way clutch assembly adapted to be disposed between a pair of concentric cylindrical races comprising cage means adapted to be disposed concentrically between said races and having a plurality of circumferentially spaced openings therein, a plurality of sprags, each of said sprags having a rigid body portion and being disposed in one of said openings, the opposite ends of said sprags projecting from said cage means for engaging said races, and shoulder means circumferentially projecting from opposite sides of said body portions so as to be substantially equally spaced from said races, said shoulder means having arcuate surfaces supporting said cage means concentric with said races, each of said arcuate surfaces being coaxial with the line of contact between one end of its sprag and the adjacent race.

3. In a one way clutch, a plurality of tiltable sprags having opposite ends engageable with a pair of relatively rotatable coaxial races, an annular cage between said races, the cage having a plurality of circumferentially spaced sprag-receiving openings, each sprag longitudinally extending through a cage opening and each cage opening conforming in shape to the sprag portion therein, the cage having spaced open ends to provide for circumferential cage expansion and contraction, outwardly projecting members respectively extending from opposite side walls of each sprag, and said members cooperatively engaging the same side of the cage and supporting the cage in radially spaced relation to each race.

4. In a one way clutch, a plurality of tiltable sprags having opposite ends engageable with a pair of relatively rotatable coaxial races, a pair of radially spaced annular cages between and spaced from both of said races, each cage having a plurality of circumferentially spaced sprag-receiving openings, each sprag longitudinally extending through one of said openings in each cage, each cage opening conforming in shape to the sprag portion therein, each cage having an open-ended portion to provide for circumferential cage expansion and contraction, members laterally projecting from the side walls of the sprags, said members cooperatively supporting one of said cages in spaced relation to both of the races, and said sprags supporting said other cage in radially spaced relation to the member-supported cage.

5. A one way clutch assembly for operation between relatively rotatable coaxial cylindrical races comprising a series of circumferentially spaced sprags having curved ends engageable with said races, a pair of sheet metal annular cages supported by said sprags in radially spaced relation from each other and radially spaced from both of said races, each of said cages having spaced open ends, the open ends of one cage being diametrically disposed with respect to the open ends of the other cage, and each of said cages having a plurality of circumferentially spaced sprag-receiving openings positioned in register with the corresponding opening in the other cage.

6. A one way clutch for use between a pair of concentric cylindrical races comprising an inner cage, an outer cage disposed concentrically about said inner cage and being relatively rotatable thereto, said cages being radially spaced from each other and radially spaced from both races, each of said cages comprising a sheet metal member formed into a substantially cylindrical shape with the opposite ends thereof being disposed adjacent each other in spaced relation to form a slot extending axially of said cage, the slot in one of said cages being diametrically disposed from the slot in the other cage, each of said cages having a plurality of circumferentially spaced openings positioned to register with the openings in the other of said cages, sprags disposed in said registering openings with the opposite ends thereof being adapted to engage said races, and lugs laterally projecting outwardly from the sides of each sprag, said lugs cooperatively supporting one of said cages and sprag means supporting said other cage in spaced relation to the lug-supported cage.

References Cited in the file of this patent

UNITED STATES PATENTS

| | | |
|---|---|---|
| 2,399,749 | Lund | May 7, 1946 |
| 2,404,221 | Dodge | July 16, 1946 |
| 2,473,250 | Hoffman | June 14, 1949 |
| 2,486,603 | King, Jr. | Nov. 1, 1949 |
| 2,636,584 | Swenson | Apr. 28, 1953 |
| 2,683,509 | Jandasek | July 13, 1954 |
| 2,683,510 | Troendly | July 13, 1954 |
| 2,750,019 | Ferris | June 12, 1956 |
| 2,753,028 | Dodge | July 3, 1956 |

FOREIGN PATENTS

| | | |
|---|---|---|
| 134,158 | Australia | Sept. 6, 1949 |